United States Patent [19]

Hartman

[11] 4,449,880

[45] May 22, 1984

[54] TILTABLE PLATFORM

[75] Inventor: John E. Hartman, Park, Mich.

[73] Assignee: National Bulk Equipment, Inc., Holland, Mich.

[21] Appl. No.: 430,163

[22] Filed: Sep. 30, 1982

[51] Int. Cl.³ .......................................... B65G 65/30
[52] U.S. Cl. ................................... 414/421; 406/141
[58] Field of Search ...................... 414/421, 699, 701; 406/141; 248/371, 372.1, 398; 222/64

[56] References Cited

U.S. PATENT DOCUMENTS

| | | | |
|---|---|---|---|
| 2,578,116 | 12/1951 | White et al. | 414/421 |
| 2,727,641 | 12/1955 | Tomkins | 414/421 X |
| 3,042,237 | 7/1962 | Dole | 414/421 |
| 3,198,395 | 8/1965 | McKinney | 222/181 X |
| 3,224,653 | 12/1965 | Cooke | 222/547 X |

*Primary Examiner*—Joseph E. Valenza
*Assistant Examiner*—Stuart Millman
*Attorney, Agent, or Firm*—Flynn, Thiel, Boutell & Tanis

[57] ABSTRACT

A load supporting apparatus includes a base, and a platform adapted to support the load is pivotally supported on the base for movement between first and second positions, the platform becoming increasingly tilted as it moves from the first to the second position. A drive mechanism cooperable with the platform is provided for effecting pivotal movement thereof, and a control mechanism cooperable with the drive mechanism is provided for automatically actuating the drive mechanism to effect movement of the platform toward the second position in response to a shift in the distribution of the load thereon, thereby further tilting the platform and effecting a redistribution of the load. The control means is also responsive to the redistribution of the load caused by tilting of the platform for automatically deactuating the drive mechanism.

12 Claims, 8 Drawing Figures

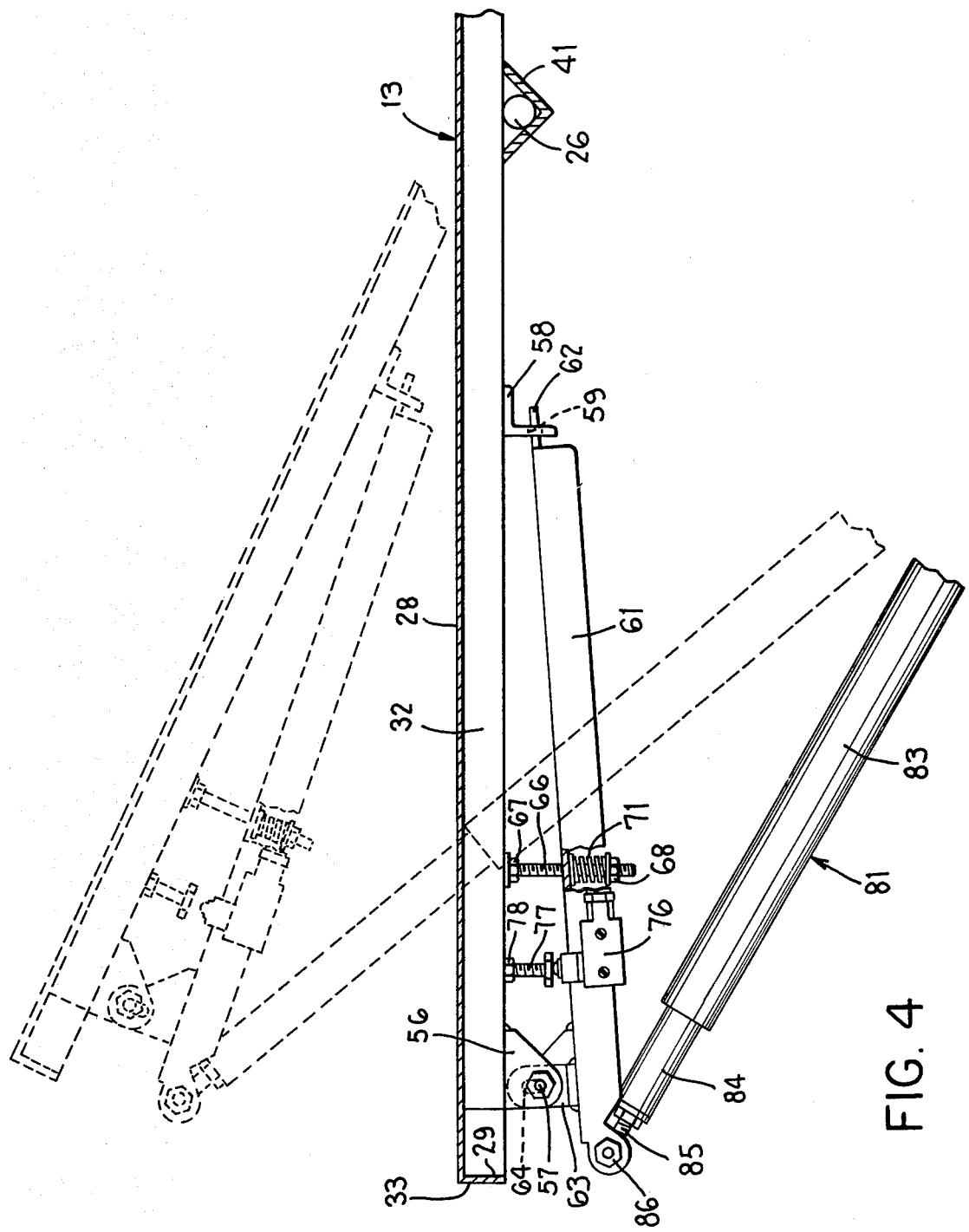

TILTABLE PLATFORM

FIELD OF THE INVENTION

This invention relates to an apparatus for unloading a container and, more particularly, to an apparatus adapted to tilt the container during unloading thereof in order to facilitate removal of the material therein.

BACKGROUND OF THE INVENTION

There are a number of industrial applications in which relatively large bins or containers filled with a granular or finely divided material must be emptied. In the plastic injection molding industry, for example, extruding machines require a continuous supply of small plastic pellets. These pellets are typically shipped in relatively large containers, commonly known as "gaylords", and the pellets are withdrawn from the container by inserting a vacuum hose into the receptacle, the open end of the hose being located near the bottom of the container.

In order to facilitate removal of the pellets, unloading systems have been developed in which the container is supported on a tiltable platform. The open end of the vacuum hose is positioned in a lower corner of the container and, as the container is emptied by the hose, the machine operator periodically increases the tilt of the platform to progressively lower such corner and cause the granular material to flow to that corner. Devices of this general type which are adapted to tilt containers to facilitate unloading thereof are disclosed, for example, in U.S. Pat. Nos. 2,578,116, 3,198,395 and 3,224,653.

Although unloading systems of this type have generally been adequate for their intended purposes, they have not been satisfactory in all respects. In particular, it is frequently not practical to fully tilt the platform immediately after placing the container on it, because in many applications the top of the container is open and a substantial amount of the granular material therein would flow out of the container and onto the floor. Therefore, it has typically been necessary for the machine operator to periodically and manually actuate a control to incrementally increase the tilt of the platform as the container is emptied. This is a tedious task for the operator and can lead to unnecessary delays in production if the operator forgets to tilt the platform to redistribute the material in the container and all of the material in the region of the corner having the hose is removed. Moreover, it is difficult if not impossible for a single operator to simultaneously control the unloading of more than one or two containers in an efficient manner, because the operator must carefully monitor the unloading of each of the containers and periodically actuate the control for each to further tilt the associated platform.

Accordingly, it is an object of the present invention to provide an apparatus for unloading a container which is responsive to the distribution of the material in the container and is adapted to automatically tilt the container in order to effect a redistribution of such material.

A further object of the invention is to provide an apparatus, as aforesaid, which is also responsive to the redistribution of the material caused by tilting of the container for stopping the tilting movement.

A further object of the invention is to provide an apparatus, as aforesaid, which can be safely used in an "explosive" environment.

A further object of the invention is to provide an apparatus, as aforesaid, which is rugged and dependable and requires little or no maintenance.

A further object of the invention is to provide an apparatus, as aforesaid, which is relatively inexpensive to manufacture and assemble.

SUMMARY OF THE INVENTION

The objects and purposes of the invention, including those set forth above, are met by providing an apparatus which includes a base and a load support, the load support being supported on the base for movement between first and second positions and becoming increasingly tilted with respect to a horizontal reference as it moves from the first to the second position. A drive mechanism cooperable with the load support is provided for moving it between the first and second positions, and a control arrangement cooperable with the drive mechanism is provided for actuating the drive mechanism so as to effect movement of the load support toward its second position in response to a shift in the distribution of the load on the load support, the load support becoming increasingly tilted and thereby effecting a redistribution of the load.

The control arrangement is preferably responsive to the redistribution of the load caused by tilting of the load support for deactuating the drive mechanism to stop the tilting movement of the load support.

In a preferred embodiment, the load support is pivotal about a substantially horizontal axis, and the drive mechanism includes a driven member which is movable between third and fourth positions. The control mechanism couples the drive member to the load support so that the load support is movable a small amount about its horizontal axis between fifth and sixth positions relative to the driven member, and so that movement of the driven member between its third and fourth positions effects movement of the load support between its first and second positions, respectively. The control arrangement also includes a sensing mechanism responsive to movement of the load support relative to the driven member and adapted to actuate the drive mechanism when the load support and driven member are in the sixth position relative to each other.

The sensing mechanism preferably includes an elongate control member having one end pivotally supported on the load support for movement about a second axis, the driven member being coupled to the control member at a location thereon remote from the further axis. A mechanism is provided for limiting pivotal movement of the control member relative to the load support, and a resilient arrangement continually and yieldably urges the control member toward the load support. A switching mechanism supported on one of the control member and load support is actuated by the other of said control member and load support when they are in the sixth position, and responds by actuating the drive mechanism to effect movement of the driven member toward its fourth position.

BRIEF DESCRIPTION OF THE DRAWINGS

Two preferred embodiments of the invention will be described in detail hereinafter with reference to the accompanying drawings, in which:

FIG. 4 is a further, fragmentary sectional side view of the apparatus of FIG. 1;

Figure 1:
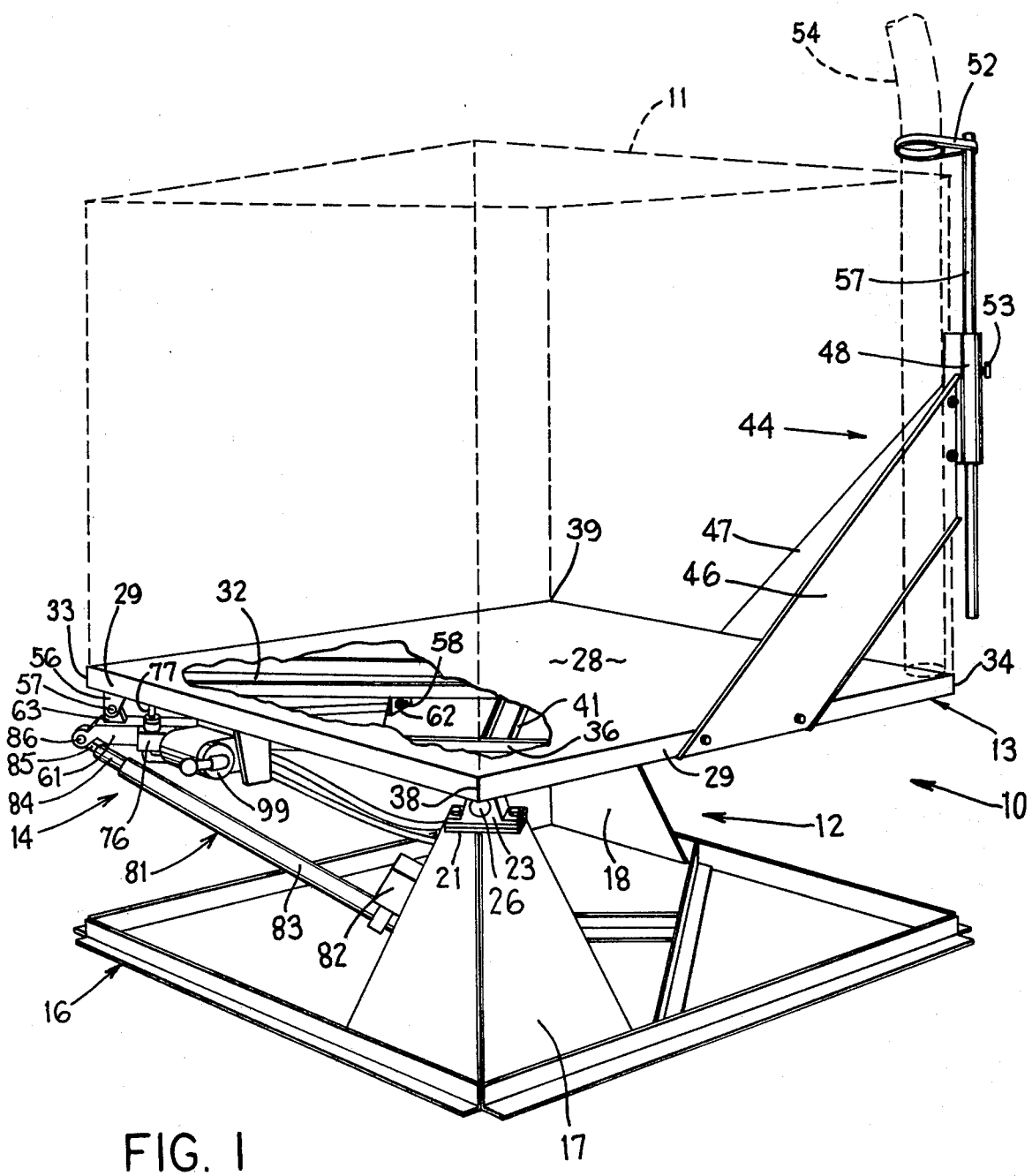
FIG. 1 is a fragmentary perspective view of an unloading apparatus embodying the present invention.

Certain terminology will be used herein for convenience in reference only and is not to be considered limiting. The words "up" and "down" will designate directions in the drawings to which reference is made. The words "in" and "out" will respectively refer to directions toward and away from the geometric center of the device and designated parts thereof. Such terminology will include the words specifically mentioned, derivatives thereof and words of similar import.

DETAILED DESCRIPTION

Referring to FIG. 1, an apparatus 10 for unloading a container 11 includes a base 12, a platform 13 and a control mechanism 14. The container 11, illustrated in broken lines, is a generally rectangular box and would typically be filled with a granulated material such as small plastic pellets for an injection molding apparatus.

Figure 3:
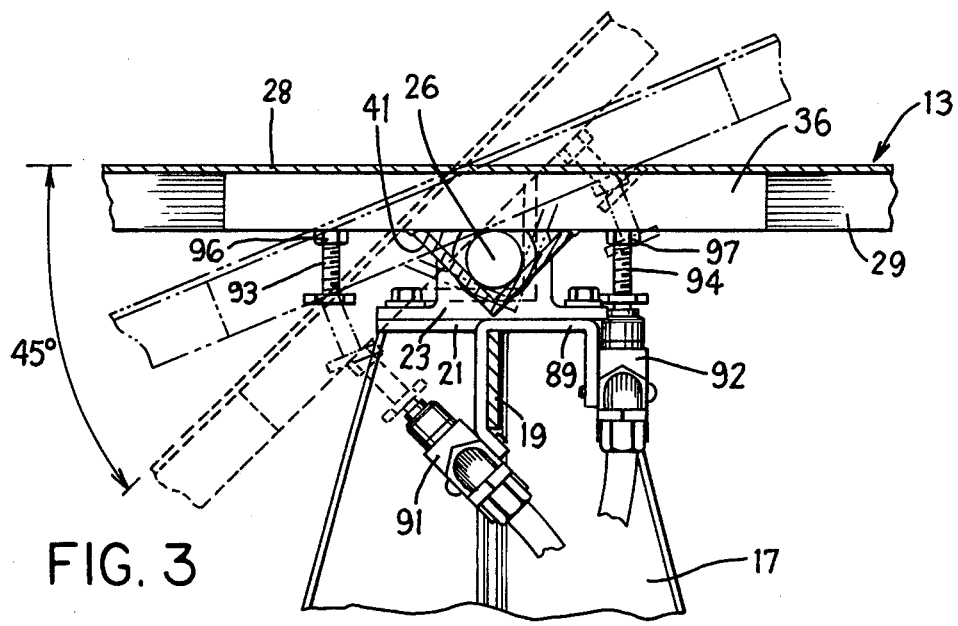
FIG. 3 is a fragmentary sectional view taken along the line III—III of FIG. 2.
Figure 2:
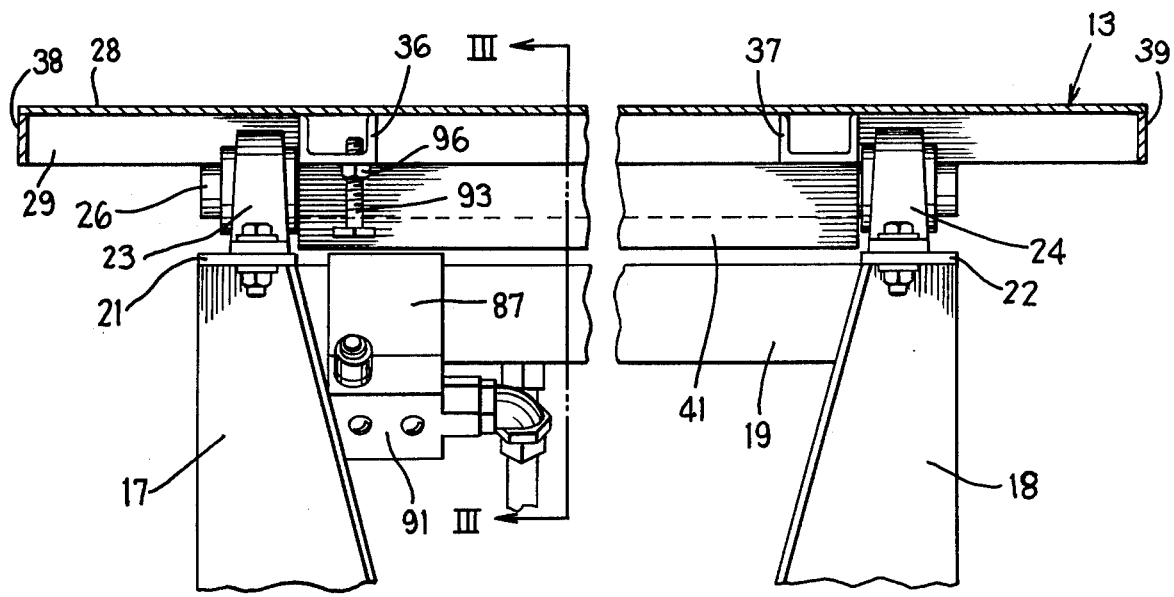
FIG. 2 is a sectional side view of the apparatus of FIG. 1.

The base 12 includes a generally square, braced frame 16 which rests on the factory floor and two supports 17 and 18 which project upwardly from diagonally opposite corners of the frame 16 and are secured thereto in a conventional manner, for example by welding. As shown in FIGS. 2 and 3, a vertical, horizontally elongated plate 19 extends between and is welded to the upper ends of the supports 17 and 18 in order to stabilize them.

As shown in FIGS. 1 and 2, respective horizontal plates 21 and 22 are welded to the tops of the supports 17 and 18, and respective bearing assemblies 23 and 24 of a conventional type are bolted to the plates 21 and 22 so as to be coaxially aligned. A horizontal axle 26 extends between and is rotatably supported in the bearing assemblies 23 and 24.

The platform 13 has a top wall 28 of sheet metal and four side walls 29 extending downwardly from the peripheral edges of the top wall. As shown in FIG. 1, a U-shaped channel 32 is welded to the underside of the top wall 28 and extends diagonally from a corner 33 of the platform 13 to a corner 34 thereof. U-shaped channels 36 and 37 extend parallel to and are provided on opposite sides of the channel 32. The channel 36 is located near a corner 38 of the platform 13 and the channel 37 is located near a corner 39 thereof, and both are welded to the underside of the top wall 28. As shown in FIGS. 1 and 2, a V-shaped angle 41 is welded to the underside of the channels 32, 36 and 37 and extends substantially perpendicular thereto. As shown in FIG. 2, the length of the channel 41 is slightly less than the distance between the bearing assemblies 23 and 24 and the channel 41 is received therebetween, the horizontal axle 26 extending through the channel 41. The dimensions of the channel 41 are selected so that the axle 26 is held with minimal play between the channel 41 and the undersides of the channels 32, 36 and 37, as shown in FIG. 3.

The platform 13 has a container and hose retaining apparatus 44 at the corner 34 thereof. Two supports 46 and 47 are bolted to respective side walls 29 of the platform 13 adjacent the corner 34 and extend upwardly at an incline to a location above the corner 34, where they are bolted to each other and to a vertical sleeve 48. A cylindrical rod 51 is vertically slidably supported in the sleeve 48 and has a hose retaining bracket 52 secured to the upper end thereof. The rod 51 is retained in a selected vertical position by means of a set screw 53 threadedly received in an opening through a wall of the sleeve 48. A vacuum hose 54, shown in broken lines, can be inserted through the hose retaining bracket 52 and thereby held in position during operation of the device.

Referring to FIGS. 1 and 4, the control mechanism 14 includes a clevis 56 which is secured to the underside of the central channel 32 at the end thereof adjacent the corner 33 of the platform 13, and a bolt 57 extends through aligned openings in the spaced flanges thereof and is secured by a nut. An L-shaped bracket 58 is secured to the underside of the central channel 32 between the clevis 56 and the axle 26, and has a generally horizontal slot 59 provided in the downwardly extending portion thereof. An elongate control member 61, made from a U-shaped channel, has a tab 62 at one end thereof which is loosely received in the slot 59 of the bracket 58, the control member 61 thereby being supported for generally pivotal movement about a horizontal axis substantially coincident with the center line of the slot 59. An upright flange 63 is secured to the upper side of the control member 61 near the opposite end thereof and has an arcuate slot 64 therein which is approximately concentric with the pivot axis of the control member 61 defined by the tab 62 and slot 59. The flange 63 is movably received in the clevis 56, the bolt 57 being slidably received in the slot 64. Engagement of the bolt 57 with opposite ends of the slot 59 limits pivotal movement of the control member 61.

A vertical screw stud 66 is threadedly received in a threaded opening provided in the underside of the central channel 32, and is secured against unintended rotation by a lock nut and washer 67. The screw stud 66 extends through an opening provided in the control member 61 approximately intermediate the ends thereof, and a nut 68 is provided on the screw stud 66 on the side of the control member 61 remote from the central channel 32. Two flat washers are provided on the screw stud 66 between and respectively adjacent the nut 68 and control member 61, and a helical compression spring 71 is provided on the screw stud 66 between the two washers.

A normally open electric load leveling switch 76 is secured to the control member 61 between the flange 63 and the opening for the screw stud 66. A bolt 77 threadedly engages a threaded opening provided in the underside of the central channel 32, and a lock nut 78 provided on the bolt 77 can be tightened against the central channel 32 to prevent inadvertent rotation of the bolt 77. The head of the bolt 77 is arranged to engage and actuate the load leveling switch 76 as the control member 61 pivots toward the platform 13.

As shown in FIG. 1, the control mechanism 14 also includes a linear actuator 81 and a reversible electric motor 82 drivingly coupled thereto. The linear actuator 81 is a conventional and commercially available device, and in the preferred embodiment is a Model No. 85199 manufactured by Motion Systems Corp., Box 11, of Shrewsbury, NJ 07701. It includes a sleeve 83 having its lower end pivotally supported on the base frame 16 and a rod 84 axially movably supported within the sleeve 83 and having at its upper end an eye bolt 85 which is pivotally coupled to the outer end of the control member 61 by means of a bolt and nut 86. Operation of the motor 82 in a forward direction causes the rod 84 to move axially out of the sleeve 83, and operation of the motor 82 in a reverse direction causes the rod 84 to move axially into the sleeve 83. The rod 84 is thus a driven member, movement of which effects pivotal movement of the platform 13.

The linear actuator 81 is capable of smoothly effecting small increments of movement of the rod 84, preferably with gradual acceleration and deceleration during starting and stopping thereof.

As shown in FIGS. 2 and 3, a bracket 89 of approximately inverted U-shape is secured to the stabilizing plate 19, for example by welding. Normally closed electric limit switches 91 and 92 are secured to the ends of respective legs of the bracket 89. Respective bolts 93 and 94 are received in threaded openings provided in the underside of the channel 36 and respectively actuate the limit switches 91 and 92 in response to pivotal movement of the platform 13 about the axle 26. The bolts 93 and 94 are preferably adjusted so that the limit switch 92 is actuated when the platform 13 is in a substantially horizontal position, as shown in FIG. 3, and so that the limit switch 91 is actuated when the platform has been tilted to an angle of approximately 45° with respect to a horizontal reference. Lock nuts 96 and 97 are provided on the bolts 93 and 94 and are tightened against the channel 36 to prevent inadvertent rotation of the bolts 93 and 94.

As shown in FIG. 1, a three-position, manually operable switch 99 of a conventional and commercially available type is secured to the underside of the platform 13. This switch is a three-position switch, one position enabling operation of the motor 82 in the forward direction, a second position enabling operation of the motor 82 in the reverse direction, and the third position being an off position.

Figure 5:
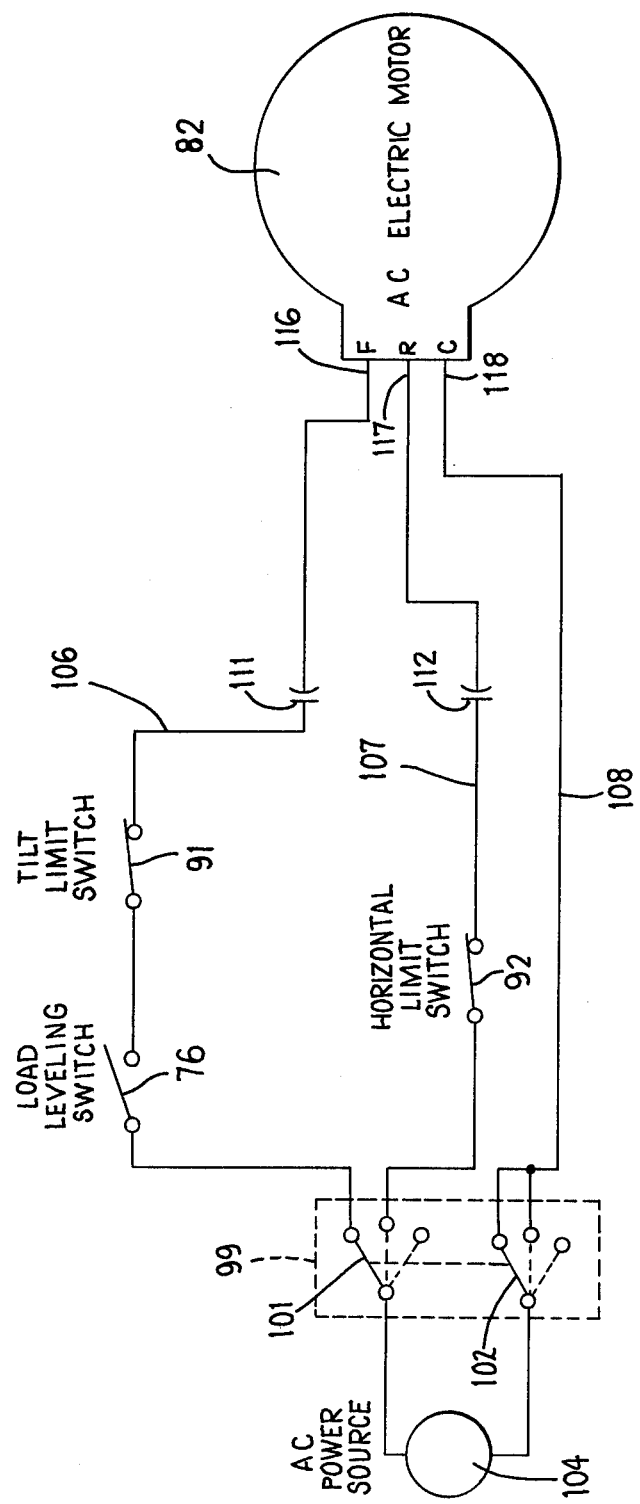
FIG. 5 is an electrical schematic of a control circuit for the apparatus of FIG. 1.

FIG. 5 is a schematic of the electrical circuit for the control mechanism 14. As shown in FIG. 5, the switch 99 has two ganged contacts 101 and 102, each connected to a respective terminal of a conventional AC power source 104. The upper, central and lower positions of the contacts 101 and 102 in FIG. 5 correspond to the forward, reverse and off positions of the switch 99. The upper and central terminals of the contact 101 are connected by respective wires 106 and 107 to the forward terminal 116 and reverse terminal 117, respectively, of the motor 82. The upper and central terminals of the contact 102 are connected by a single wire 108 to the common terminal 118 of the motor 82. The load leveling switch 76 and the limit switch 91 are provided in series with each other in the line 106, and the limit switch 92 is provided in the line 107. Capacitors 111 and 112 are provided in the lines 106 and 107, respectively, to protect the motor 82.

ALTERNATE EMBODIMENT

Figure 6:
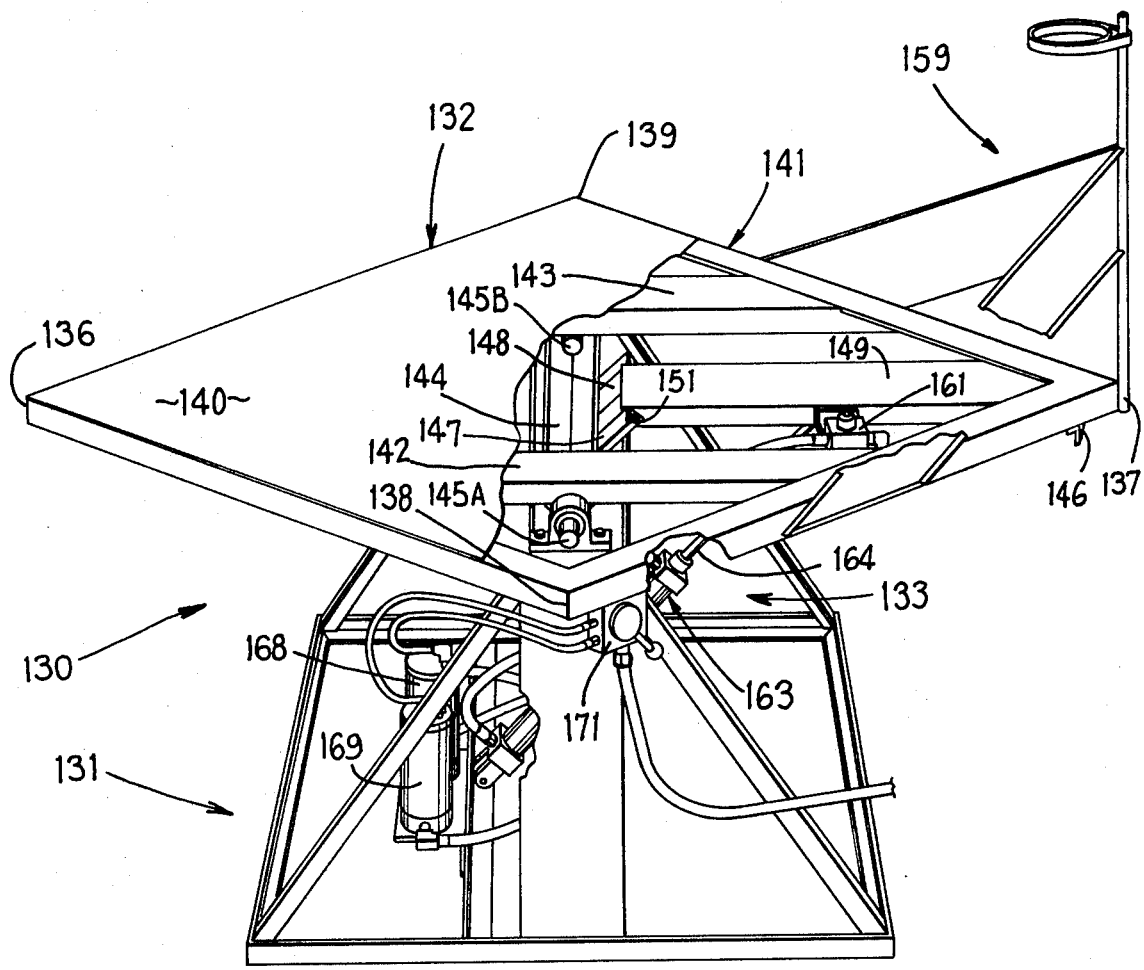
FIG. 6 is a fragmentary perspective view of an alternative embodiment of the apparatus of FIG. 1.
Figure 7:
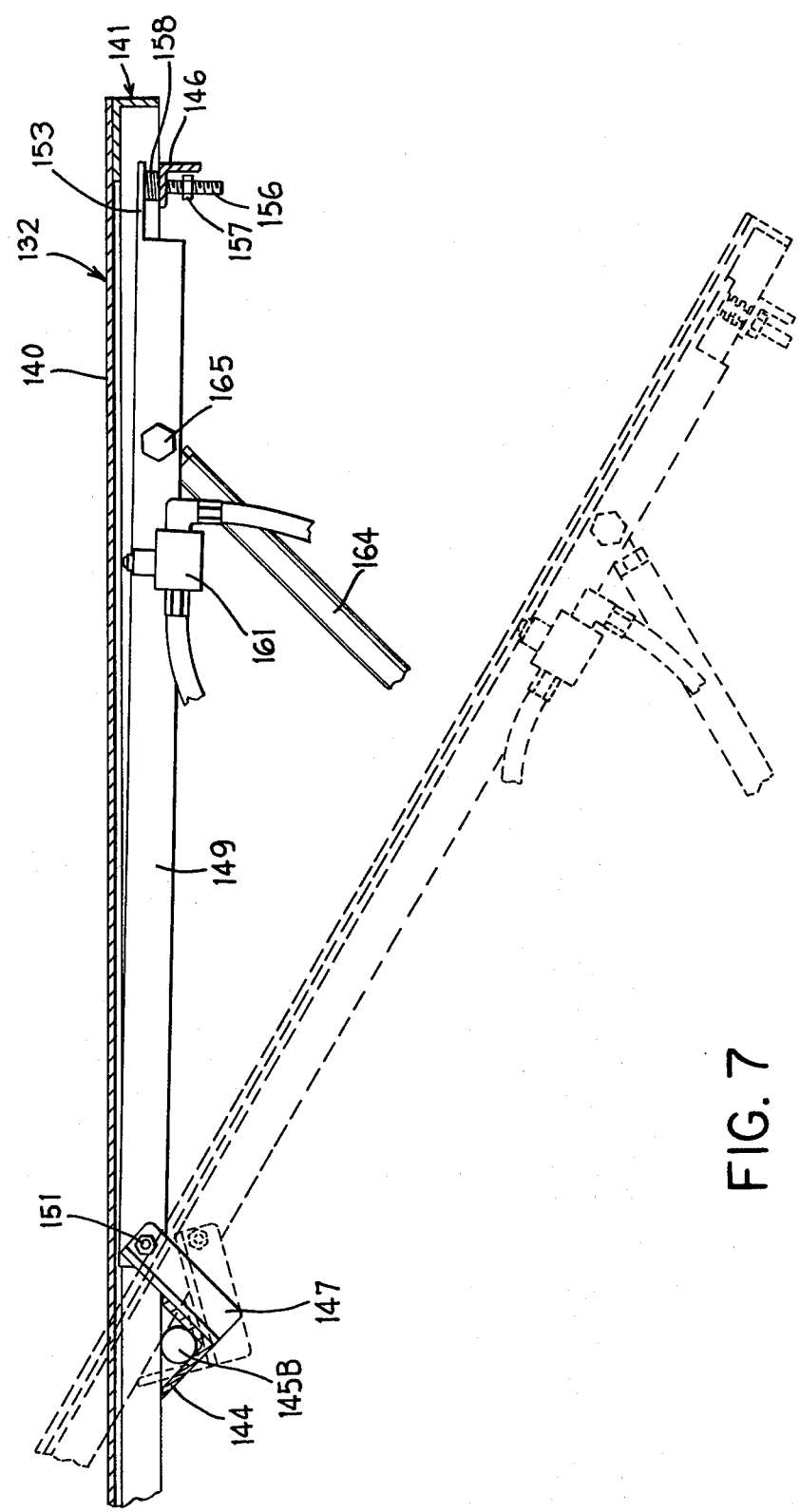
FIG. 7 is a fragmentary sectional side view of the apparatus of FIG. 6.
Figure 8:
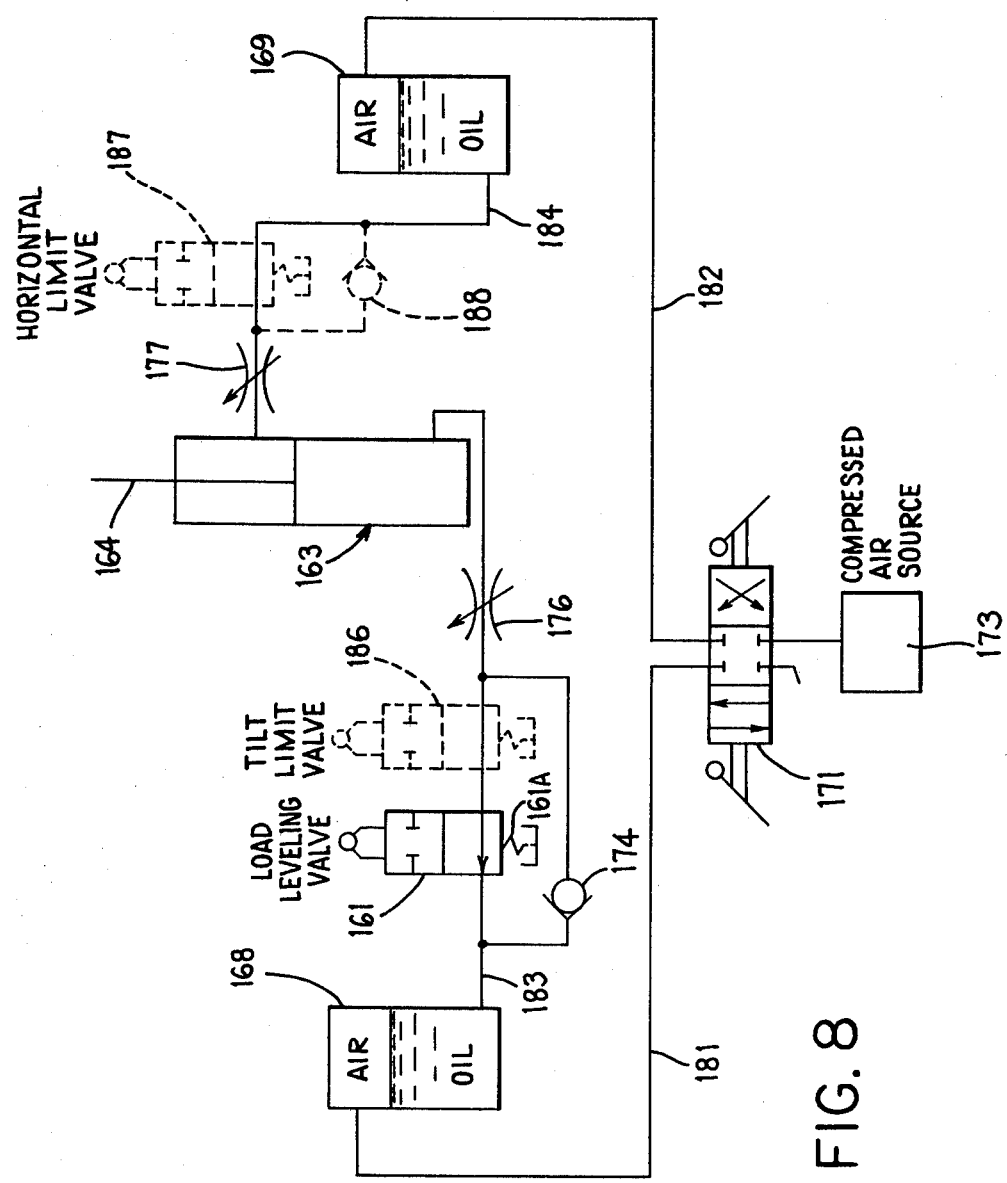
FIG. 8 is a schematic diagram of a hydraulic control system for the apparatus of FIG. 6.

(FIGS. 6 to 8)

The alternative embodiment of FIGS. 6 to 8 is adapted for use in an "explosive" environment and therefore has a pneumatic/hydraulic control mechanism which has no electric components or switches and therefore will not create sparks. It is similar in many respects to the embodiment of FIGS. 1 to 5, and therefore only structural differences significant to the present invention are discussed in detail. The apparatus 130 illustrated in FIG. 6 includes a base 131, a platform 132 and a control mechanism 133. The base 131 differs in some respects from the base 12 illustrated in FIG. 1, but could be identical to the base 12 and is therefore not described in detail.

The platform 132 is approximately square and has four corners 136, 137, 138 and 139. A sheet metal top wall 140 is provided on a square frame 141 made of L-angles. Two spaced, inverted U-channels 142 and 143 each have their ends welded to the frame 141 approximately in the center of adjacent sides thereof. A V-channel 144 is welded to the undersides of the channels 142 and 143 and extends substantially perpendicular thereto. Two spaced and coaxial axles 145A and 145B are rotatably supported in bearing assemblies on the base 131, are received within the V-channel 144 and extend beneath the U-channels 142 and 143.

As shown in FIGS. 6 and 7, two spaced brackets 147 and 148 are welded to the V-channel 144 and an inverted U-angle 149 which serves as a control member has one end pivotally supported on the upper ends of the brackets 147 and 148 by means of bolts and nuts 151 disposed in aligned openings therein. An L-angle 146 which extends approximately parallel to the V-channel 144 is welded to the underside of the frame 141 near the corner 137 of the platform 132. A horizontal tab 153 is provided at the outer end of the control member 149 and is disposed between the L-angle 146 and the underside of the platform top wall 140. A screw stud 156 is secured to the tab 153 and projects downwardly through an opening provided in the L-angle 146. A nut 157 is provided on the screw stud 56 below the L-angle 146 and a helical compression spring 158 is provided around the screw stud 156 between the tab 153 and the L-angle 146. Pivotal movement of the control member 149 is limited by engagement of the tab 153 and nut 157 with the L-angle 146.

A container and hose retaining apparatus 159 similar to the apparatus 44 of FIG. 1 is provided on the platform 132 at the corner 137 thereof.

A hydraulic load leveling valve 161 is secured to the control member 149. The underside of the platform top wall 140 engages and actuates the valve 161 when the control member 149 pivots toward the platform 132.

A fluid actuated cylinder 163 (FIG. 6) has its lower end pivotally supported on the base 131 and has the upper end of its piston rod 164 pivotally supported on the control member 149 near the outer end thereof by means of a bolt 165.

As shown in FIG. 6, the control mechanism 133 also includes two closed reservoirs 168 and 169, each having a lower portion filled with oil and an upper portion filled with air, and includes a three-position, manually operable pneumatic valve 171.

FIG. 8 illustrates an exemplary pneumatic and hydraulic circuit for controlling the apparatus of FIG. 6. It includes the manually operable valve 171, the reservoirs 168 and 169, the fluid actuated cylinder 163 and the load leveling valve 161, as well as a conventional compressed air source 173, a check valve 174, and two manually adjustable valves 176 and 177, these components being interconnected in the manner illustrated in FIG. 8. The interconnections include lines 181 and 182 which respectively connect two ports of the valve 171 to upper portions of the reservoirs 168 and 169, and lines 183 and 184 which respectively connect the lower portions of the reservoirs 168 and 169 to the interior of the cylinder 163 on opposite sides of the piston therein. The load leveling valve 161 and check valve 174 are connected in parallel with each other and in series with the adjustable valve 176 in the line 183, and the adjustable valve 177 is provided in the line 184.

Limit valves 186 and 187 can optionally be provided in the circuit of FIG. 8 as shown in broken lines to limit speed of pivotal movement of the platform 132. These limit valves would preferably be supported beneath the platform 132 and actuated in a manner similar to that illustrated in FIG. 3 for the electric limit switches 91 and 92. A check valve 188 would be connected in parallel with the limit valve 187 in the manner shown in FIG. 8.

OPERATION

The embodiment of FIG. 1 operates in the following manner. Initially, the platform 13 is in the horizontal position illustrated in FIG. 1 and the manually operable switch 99 is in its off position. A container 11, filled with plastic pellets or an equivalent material, is then placed on the platform 13 and the vacuum hose 54 is inserted through the hose retaining bracket 52 and into the container 11 so that its lower end is in the lower corner of the container 11 adjacent the corner 34 of the platform 13. If necessary, the position of the rod 51 and bracket 52 can be adjusted by loosening the set screw 53, making the adjustment, and then tightening the set screw 53.

In this position, the material in the container 11 is relatively evenly distributed and the center of gravity of the container 11 and platform 13, due to the weight of the apparatus 44 and hose 54, will be on the side of the axle 26 nearest the corner 34 of the platform 13, and will thus be urging the platform 13 to pivot in a clockwise direction in FIG. 1. The platform 13 will thus tend to pivot away from the control member 61, which cannot move with the platform 13 because it is coupled to the rod 84 of the linear actuator 81. The control member 61 (FIG. 4) is in its farthest position from the platform 13, the bolt 57 being disposed against the upper end of the slot 64 in the flange 63 and the load leveling switch 76 being unactuated and thus open.

The operator then manually switches the switch 99 to its forward position, in which the contacts 101 and 102 are in the positions illustrated in FIG. 5. Since the platform 13 is in its horizontal position, the normally closed tilt limit switch 91 will not be actuated and will therefore be closed, but the load leveling switch 76, as mentioned above, will be open, thereby preventing electric current from flowing through the line 106 to the motor 82. Accordingly, the motor 82 is not immediately actuated and the platform 13 will remain in its horizontal position.

As the vacuum hose 54 withdraws material from the container 11 in the region of the corner 34 of the platform 13, the center of gravity of the platform 13 and the remaining material in the container 11 will shift leftwardly in FIG. 1 until it is on the opposite side of the axle 26 and causes the platform 13, in association with the urging of the spring 71, to pivot counterclockwise in FIG. 4 and toward the control member 61 until the bolt 57 is at the lower end of the slot 64 in the flange 63 and the bolt 77 actuates the load leveling switch 76 and closes it.

Referring to FIG. 5, when the load leveling switch 76 closes, it completes a circuit for the motor 82, causing the motor 82 to run in a forward direction. This in turn causes the rod 84 of the linear actuator 81 (FIG. 1) to move slowly and axially out of the sleeve 83, thereby causing the platform 13 to pivot clockwise in FIG. 1. The container 11 will be prevented from sliding off the platform 13 by the supports 46 and 47. As the platform 13 is tilted, the material in the left side of the container 11 will begin to flow toward the hose 54 under the force of gravity.

This redistribution of the material eventually displaces the combined center of gravity of the platform 13 and material remaining in the container 11 to the side of the axle 26 nearest the corner 34 of the platform 13, causing the platform 13 to rotate clockwise in FIG. 4 relative to the control member 61 and against the urging of the spring 71 until the bolt 57 is again at the upper end of the slot 64 in the flange 63 and the load leveling switch 76 has opened. As shown in FIG. 5, this will again interrupt power to the electric motor 82, thereby terminating pivotal movement of the platform 13.

When the removal of material from the container 11 by the hose 54 again causes the center of gravity of the platform and remaining material to shift to the side of the axle 26 remote from the platform corner 34, the platform 13 will again pivot clockwise relative to the control member 61 and actuate the switch 76, thereby energizing the motor 82 and causing the platform 13 to be tilted even farther about the axle 26. This periodic incremental tilting of the platform 13 will continue until the platform 13 reaches an angle of about 45° with respect to a horizontal reference and the tilt limit switch 91 is actuated, thereby opening the contact of this switch in the circuit of FIG. 5 to stop the electric motor 82 and thereby prevent any further pivotal movement of the platform 13 in a clockwise direction in FIG. 1.

Through the foregoing sequence, the platform 13 and container 11 will have moved to a position in which the corner of the container 11 adjacent the corner 34 of the platform 13 is lower than the rest of the container 11 so that all remaining material in the container tends to flow to that corner, thereby facilitating removal by the vacuum hose 54 of substantially all of the material in the container 11.

Thereafter, the operator will move the switch 99 to its reverse position, which moves the contacts 101 and 102 in FIG. 5 to their central position. Since the normally closed limit switch 92 is not actuated when the platform 13 is tilted, power will flow through the lines 107 and 108 and cause the motor 82 to run in a reverse direction, which in turn will cause the rod 84 of the linear actuator 81 to be drawn axially into the sleeve 83 thereof. This will cause the platform 13 to pivot counterclockwise about the axle 26 in FIG. 1 in a continuous manner until the platform reaches a horizontal position and actuates the limit switch 92, thereby opening its contact in the circuit of FIG. 5 and interrupting power to the motor 82 to prevent movement of the platform 13 past the horizontal position. The hose 54 is then removed from the container 11 and the container 11 is removed from the platform 13. The sequence of events described above can then be repeated for another full container 11.

The overall operation of the embodiment of FIGS. 6 to 8 is similar to that of the embodiment of FIGS. 1 to 5. The differences reside primarily in the manner in which the control mechanism 133 effects such operation. Accordingly, the following description of the operation of the embodiment of FIGS. 7 to 8 will focus primarily on the control system 133.

After a container filled with a granular material has been placed on the platform 113 and a vacuum hose inserted through the hose support and into the container, the combined center of gravity of the platform 132 and the material in the container will lie on the side of the axles 145A and 145B nearest the corner 137 of the platform 132. The platform 132 will thus be urged to pivot clockwise in FIG. 6 toward the control member 149, and the control member 149 will thus be in a position adjacent the platform 132 and the top wall 140 of the platform 132 will be actuating the normally open valve 161. In other words, the valve core illustrated schematically in FIG. 8 will be pressed down against the force of the spring 161A and will prevent fluid flow through the valve 161.

The operator will then move the pneumatic valve 171 from its off position, illustrated in FIG. 8, to its forward position, which corresponds to a rightward shift of the valve member illustrated schematically in FIG. 8. The valve 171 will thus supply compressed air from the compressed air source 173 through the line 182 to the upper portion of the reservoir 169, thereby pressurizing the reservoir 169 and urging the oil therein to flow through the line 184 and valve 177 and into the cylinder 163 above the piston. Limit valve 187, if present, will be closed to fluid flow when the platform 132 is in its horizontal position, but the check valve 188 will permit the initial leftward fluid flow through line 184 which is necessary to initiate pivotal movement of the platform 132. Limit valve 186, if present, will be open. Since the valve 161 is closed, however, and since fluid cannot flow leftwardly through the check valve 174, the noncompressible oil beneath the piston cannot flow out of the chamber 163 and the piston rod 164 will therefore not initially move. Accordingly, there will be no immediate pivotal movement of the platform 132 away from its horizontal position.

As material is withdrawn from the container, the distribution of the remaining material will be such that the combined center of gravity of the platform and the material will gradually shift leftwardly in FIG. 6 toward the corner 136 of the platform until it moves past the axles 145A and 145B, thereby causing the platform to pivot counterclockwise in FIG. 7 a small amount relative to the control member 149 and against the urging of the spring 158. This will cause the top wall 140 of the platform 132 to move out of engagement with the valve 161, and the spring 161A in that valve will move the valve core upwardly to the position illustrated in FIG. 8, thereby permitting the fluid in the lower portion of the cylinder 163 to flow through the valve 161 and into the reservoir 168, which forces an equal amount of air to flow from the upper portion of the reservoir 168 through the line 181 and valve 171 to the atmosphere. The piston rod 164 will therefore move downwardly into the cylinder 163, and will cause the platform 132 to pivot in a clockwise direction in FIG. 7 about the axles 145A and 145B. As the container tilts, the material therein will flow toward the corner 137 of the platform 132, and the center of gravity of the platform and the remaining material will gradually shift toward the corner 137 until it again lies on the right-hand side of the axles 145A and 145B, causing the platform 132 to pivot clockwise in FIG. 7 relative to the control member 149 until the top wall 140 again actuates the valve 161 to interrupt further flow of fluid through the line 183 and thus stop movement of the piston rod 164 and platform 132. As further material is withdrawn from the receptacle, the center of gravity will shift leftwardly again and cause the cycle just described to repeat.

Manual adjustment of the valves 176 and 177 will permit the effective cross-sectional areas of the lines 183 and 184 to be changed, thereby increasing or decreasing the rate of oil flow therethrough and thus increasing or decreasing the speed of movement of the piston rod 164. The normally open limit valve 186, if present, will be actuated when the platform 132 has been tilted to an angle of approximately 45°, and will prevent any further flow of fluid out of the cylinder 163 and thereby prevent further pivotal movement of the platform 132 in a clockwise direction.

When the vacuum hose has thereafter removed substantially all of the material from the receptacle, the operator will switch the pneumatic valve 171 to its reverse position, which corresponds to a full leftward shift of the valve core illustrated schematically in FIG. 8. The valve 171 will thereby supply compressed air from the compressed air source 173 through the line 181 to the upper portion of the reservoir 168, thereby pressurizing the reservoir 168 and causing the oil therein to flow through the line 183 and check valve 174 and into the cylinder 163 below the piston. Since the limit valve 187, if present, will not be actuated when the platform 132 is tilted, the fluid in the upper portion of the cylinder 163 will flow through the valve 187 and line 184 to the lower portion of the reservoir 169, and an equal amount of air from the upper portion of that reservoir will flow through the line 182 and valve 171 to the atmosphere. The piston rod 164 will thus move upwardly and pivot the platform 132 in a counterclockwise direction in FIG. 6. When the platform 132 reaches a horizontal position, the limit valve 187 will, if present, be actuated and interrupt fluid flow through the line 184 and thus prevent further pivotal movement of the platform 132 in a counterclockwise direction.

If the limit valves 186 and 187 and check valve 188 are not present, of course, the operator must manually switch the pneumatic valve 177 to stop pivotal movement of the platform 132 at the positions in which it is respectively horizontal and tilted at 45°.

After the platform 132 reaches the horizontal position illustrated in FIG. 6, the operator will move the pneumatic valve 171 to its off position, which corresponds to the position of the valve core illustrated in FIG. 8. The vacuum hose can then be removed from the empty container and the empty container can be removed from the platform 132. The sequence of events just described are then repeated with another full container.

An advantage of the use of oil within the cylinder 163, rather than air, is that oil is less compressible than air and therefore prevents undesired oscillatory movements of the piston rod 164 and platform 132.

Although two preferred embodiments of the invention have been disclosed in detail for illustrative purposes, it will be recognized that variations or modifications thereof, including the rearrangement of parts, lie within the scope of the present invention.

The embodiments of the invention in which an exclusive property or privilege is claimed are defined as follows:

1. An apparatus for supporting a load, comprising a base, support means adapted to support the load and supported on said base for movement between first and second positions, said support means becoming increasingly tilted with respect to a horizontal reference as it moves from said first to said second position, drive means cooperable with said support means for effecting said movement thereof between said first and second positions, and control means cooperable with said drive means for automatically actuating said drive means to effect movement of said support means toward said second position in response to a shift in the distribution of the load on said support means, whereby said support means becomes increasingly tilted and the force of gravity effects a redistribution of the load thereon.

2. The apparatus according to claim 1, wherein said control means is further responsive to said redistribution of the load caused by said tilting of said support means for automatically deactuating said drive means to stop said movement of said support means toward said second position.

3. The apparatus according to claim 2, wherein said support means is pivotal about a substantially horizontal axis, said drive means includes a driven member movable between third and fourth positions, and said control means includes means for coupling said driven member to said support means so that said support means is movable a limited amount about said axis between fifth and sixth positions relative to said driven member, movement of said drive member between said third and fourth positions effecting movement of said support means between said first and second positions, respectively, and wherein said control means also includes sensing means responsive to movement of said support means relative to said driven member for actuating said drive means when said support means is in said sixth position relative to said driven member.

4. The apparatus according to claim 3, wherein said sensing means includes an elongate control member having one end supported on said support means for pivotal movement about a further axis, said driven member being coupled to said control member at a location thereon remote from said further axis, means for limiting pivotal movement of said control member relative to said support means, resilient means continually and yieldably urging said control member toward said support means, switching means supported on one of said control member and said support means and operatively coupled to said drive means for causing said drive means to move said driven member toward said fourth position when said switching means is actuated, and means on the other of said support means and control member for actuating said switching means when said support means is in said sixth position relative to said control member.

5. The apparatus according to claim 4, wherein said means for limiting pivotal movement of said control member includes a flange fixedly supported on one of said control member and support means and having a slot therein extending approximately concentrically with respect to said further axis, and includes a pin fixedly supported on the other of said control member and support means and slidably received in said slot.

6. The apparatus according to claim 4, wherein said resilient means includes a screw stud secured on said support means and extending through an opening in said control member, a nut threadedly engaging said screw stud on the side of said control member remote from said support means, and a helical compression spring encircling said stud between said nut and control member.

7. The apparatus according to claim 4, wherein said means for limiting pivotal movement of said control member includes a frame member secured on and having a portion spaced slightly from said support means, the end of said control member remote from said one end being movably disposed between said frame member portion and said support means and having a screw stud secured thereon which extends through an opening in said frame member portion, and includes a nut threadedly engaging said stud on the side of said frame member remote from said control member, and wherein said resilient means includes a helical compression spring which encircles said stud between said frame member portion and said control member.

8. The apparatus according to claim 3, wherein said control means includes limit switch means responsive to pivotal movement of said support means in at least one direction and cooperable with said drive means for deactuating said drive means so as to prevent further pivotal movement of said support means in said direction when said support means has reached one of said first and second positions.

9. The apparatus according to claim 8, wherein said drive means includes a linear actuator, one end of said linear actuator being supported on said base and the other end thereof being said driven member, a reversible electric motor drivingly coupled to said linear actuator and control switch means connected to a power source for selectively energizing one of first and second lines which are connected to respective inputs of said motor to respectively energize said motor for operation in a forward direction or in a reverse direction, said limit switch means including two normally closed electric limit switches respectively connected in said first and second lines for interrupting the flow of power therethrough when said support means reaches said first and said second positions, respectively, and wherein said sensing means including a normally open electric switch which is connected in said second line and is closed when said support means is in said sixth position relative to said control member.

10. The apparatus according to claim 3, wherein said drive means includes a fluid operated cylinder having a piston movably supported therein and a piston rod secured to the piston, said cylinder being secured to said base and said piston rod being said driven member, two closed reservoirs which each have a lower portion filled with a fluid and an upper portion thereabove filled with air, means for selectively supplying compressed air to said upper portion of a selected one of said reservoirs, and two fluid lines respectively providing fluid communication between said lower portions of said first and second reservoirs and the interior of said cylinder on opposite sides of said piston, wherein said sensing means includes a normally open control valve provided in one of said fluid lines for interrupting the flow of fluid therethrough when said control member and support are in said fifth position, and including a check valve connected in parallel with said control valve.

11. The apparatus according to claim 10, including adjustable valve means provided in each of said fluid lines for adjusting the rate of fluid flow therethrough.

12. The apparatus according to claim 10, wherein said control means includes two normally open limit valves connected in respective said fluid lines and respectively actuated when said support means is in said first and second positions, each said limit valve interrupting fluid flow through the associated fluid line when actuated, and including check valve means connected in parallel with each said limit valve.

* * * * *